United States Patent [19]
Devitt et al.

[11] 3,897,266
[45] July 29, 1975

[54] ALKALINE BATTERY CELL

[75] Inventors: John L. Devitt, Denver; Robert E. Stark, Littleton; Leland M. Gillman, Denver, all of Colo.

[73] Assignee: The Gates Rubber Company, Denver, Colo.

[22] Filed: Aug. 3, 1970

[21] Appl. No.: 60,432

[52] U.S. Cl. ................................. 136/30; 136/143
[51] Int. Cl. ......................................... H01m 41/00
[58] Field of Search ........... 136/131, 146, 142, 143, 136/30, 13, 14, 107, 102, 177, 28

[56] References Cited
UNITED STATES PATENTS

| | | | |
|---|---|---|---|
| 2,283,379 | 5/1942 | MacCallum | 136/131 |
| 2,662,107 | 12/1953 | Uhlig et al. | 136/146 |
| 2,713,602 | 7/1955 | Shuman, Jr. | 136/146 |
| 2,981,782 | 4/1961 | Warren et al. | 136/131 |
| 3,204,156 | 8/1965 | Moresii, Jr. et al. | 136/177 |
| 3,351,495 | 11/1967 | Larsen et al. | 136/146 |
| 3,463,669 | 8/1969 | Jammet | 136/146 |
| 3,503,806 | 3/1970 | Sugalski | 136/177 |
| 3,513,033 | 5/1970 | Watanabe et al. | 136/146 |
| 3,565,691 | 2/1971 | Strier et al. | 136/146 |
| 3,669,746 | 6/1972 | Devitt et al. | 136/30 |

*Primary Examiner*—John H. Mack
*Assistant Examiner*—C. F. Lefevour
*Attorney, Agent, or Firm*—Curtis H. Castleman, Jr.; Raymond Fink; H. W. Oberg, Jr.

[57] ABSTRACT

A sealed alkaline battery cell is composed of a positive electrode, zinc-active negative electrode, electrolyte-absorbent separator and electrolyte in semi-dry amounts within the assembled cell. An essentially invariant interface between separator and adjacent negative electrode is attained by maximizing homogeneity of wetness to electrolyte along the interface and within the separator and minimizing the presence of occluded voids along the interface. The contents of the cell are spirally wound or otherwise stacked in a configuration under firm pressure.

2 Claims, 3 Drawing Figures

INVENTORS:
JOHN L. DEVITT
ROBERT E. STARK
LELAND M. GILLMAN
BY Curtis H. Castleman, Jr

INVENTORS:
JOHN L. DEVITT
ROBERT E. STARK
LELAND M. GILLMAN

BY Curtis H. Castleman, Jr

ALKALINE BATTERY CELL

BACKGROUND OF THE INVENTION

This invention relates to sealed or resealable safety-valved alkaline secondary battery cells having zinc containing anodes. More particularly, it relates to such cells wherein the contents exist in pressure relation with respect to one another. The most pertinent prior art may be found in U.S. Pat. Office Classification Class 136, Batteries.

It has long been recognized that substitution of zinc for cadmium in a sealed rechargeable battery cell provides a cost savings of up to one-fourth or even more. While nickel cadmium cells provide relatively long cycle lives, i.e., up to an average of 500 cycles or more, they do not possess the high energy densities and superior cell voltages attributable to the nickel-zinc cell. The nickel-zinc cell, however, has suffered from the phenomenon of dendritic growth or "treeing" which is produced and propagated from the zinc electrode during charge and eventually produces tree-like conductive branches which extend to the nickel electrode, shorting out the cell and seriously reducing its useful life. While many attempts have been made by investigators to eliminate or at least minimize this adverse phenomenon, none to applicants' knowledge have been able to produce a cell which would compete favorably with the nickel-cadmium or silver-cadmium cells on a performance/cost basis.

The nickel-zinc system generated considerable interest in the early decades of the twentieth century in Russia (See Russian Pat. No. 5100[1901]) and in the United States particularly under the work of James Drumm in Ireland (U.S. Pat. Nos. 1,955,115; 2,003,552 and 2,013,379). More recently there has been renewed interest in the nickel-zinc system with particular emphasis toward alleviating the problem of dendritic growth, as exemplified by U.S. Pat. No. 3,485,673 to Jost which teaches employing an aqueous electrolyte system consisting of potassium hydroxide and potassium carbonate. In "Nickel-Zinc Cells, Part I," 21st Annual Power Sources Conference, Pages 70–73, the formation of dendrites is minimized by employing a "starved electrolyte" system. It has been characteristic in the art to wrap the zinc electrodes with separator materials of varying types. The result has generally been that folds, bumps and other occluded voids are formed at various locations along the interface between the separator and electrode and within the separator itself, permitting a heterogeneous wetting condition at the interface and formation of zincate pools within the inter electrode space. This wrapping technique has been widely used in nickel-cadmium cells, as taught for example, in U.S. Pat. No. 3,410,726 to Harivel. Enclosure of the anode also severely restricts gas passage to and from the electrode, often resulting in severe gas pressure build-up, and the requirement for venting means. Lack of stacking pressure of the cell contents has also given rise to non-homogeneous wetting. The use of conventional non-woven fabric separator materials having non-uniform porosity and adverse permeability character further enhances a non-homogeneous wetting profile along the length of the electrode. We have found that dendritic growth and treeing is fostered and enhanced by this condition of heterogeneous wetting at the interface.

It is an object of this invention to produce a cell which does not appreciably heat up on charge and overcharge.

It is an object of this invention to produce a sealed or resealable safety-valved, rechargeable, nickel-zinc battery cell which may be utilized in any desired position.

It is another object of this invention to enhance the performance and cycle life of a nickel-zinc type battery cell by minimizing dendritic growth within the cell.

It is another object to maintain homogeneous wetness between the separator and zinc electrode plate of the cell.

It is another object of this invention to maintain a substantially invariant interface and the absence of occluded voids between the separator and zinc electrode plates within the cell.

It is a further object to provide for ease of gas recombination within the cell to prevent rupture.

It is still another object to provide an integral sealed or resealably safety-valved cell in which the electrode plates and separator are formed and constrained under firm stacking pressure and to form a cell of maximum energy capacity per unit volume of cell.

It is still another object to provide a cell capable of deep discharge.

These and other objects are solved by employing the cell and its method of production according to the present invention as described herein.

SUMMARY OF THE INVENTION

Briefly described, the invention comprises a sealed or resealably safety-valved, secondary battery cell in which there is contained at least one positive plate, at least one relatively smooth zinc-containing negative plate, alkaline solution wettable separator material interposed between the opposite polarity plates and electrical contact means for current collection. We have found that it is critical to the minimization of dendritic growth within the cell to maintain homogeneity of wetness along the separator/zinc electrode plate interface by insuring the substantial invariance and lack of folds, creases or other void-producing configurations along this interface. To further insure this interface invariance and the wetness homogeneity, the type of separator used is critical; i.e., it must possess uniform microporosity and particular permeability character. This uniformity must not only occur at the interface, but also along all surfaces taken substantially parallel to the interface within the separator. Pressure stacking of the plates and separator, and utilization of a "starved" electrolyte condition is further critical in minimizing dendritic growth and insuring long life of the cell.

Preferred cells of this invention may be used in place of conventional nickel-cadmium cells for nearly all of its applications, including use in portable instruments such as ohmmeters, oscilloscopes, in communications equipment and in photographic equipment. The battery is of particular interest due to the ready availability and inexpensiveness of the raw materials used in the cell formulation; the cell may be oriented in any desired position during use; and its high voltage and energy density properties are attractive.

PREFERRED EMBODIMENTS OF THE INVENTION

1. Electropositive Plate

Figure 1:
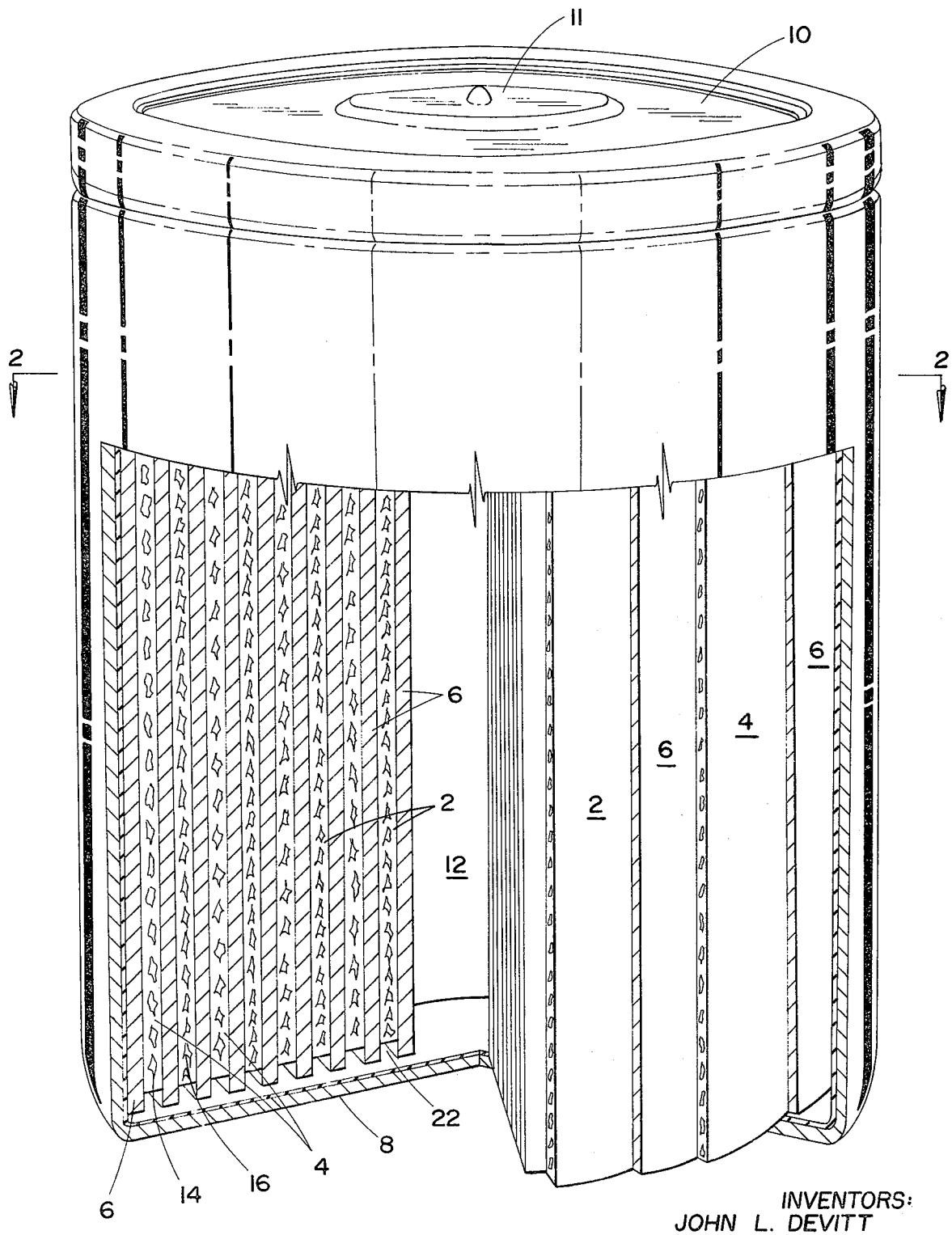
FIG. 1 depicts a partial cutaway interior view of a spiral-wound nickel-zinc cell of the present invention.

The invention is particularly adapted to cells having zinc electrodes. The opposite polarity electrode contains active material more electropositive than zinc, e.g., nickel oxides, silver oxide, manganese dioxide, oxygen gas, mixtures thereof, et cetera. The following description will pertain to the use of nickel, although the invention is not so limited and should be broadly construed.

The finished nickel-oxide positive electrode is preferably though not limited to a flexible, non-self-supporting structure capable of being rolled, packed or formed into a desired pressurized relationship within the cell container. Nickel electrodes used in conventional nickel-cadmium cells are generally suitable. For instance, impregnated electrodes are suitably made by using a porous electrically-conductive substrate comprising nickel metal dust sintered to a wire mesh nickel screen or "expanded mesh." This porous substrate is then conventionally impregnated with a solution of nickel nitrate and then immersed in a potassium hydroxide solution together with a counter-electrode to enable the basic solution to slowly diffuse into the substrate pores, precipitating nickelous hydroxide within the pores in situ. Another known method of producing nickel electrodes comprises securing particulate $\beta$-nickelic hydroxide (e.g., as prepared by the process of U.S. Pat. No. 3,489,664 to Popat, et al.) to an electrochemically active metallic substrate with the aid of a plastic binder.

It is preferred when using the aforementioned impregnated electrode, to impregnate a thin, highly reversible layer of nickel hydroxide on the substrate. Extreme physical and electrochemical reversibility is desired to accommodate a large number of charge-discharge cycles. However, since the life of the nickel-zinc cell generally depends on the relatively shorter life of the zinc electrode, the nickel plates may be of a more simple construction and still maintain satisfactory cycle life.

2. Zinc-Containing Plate

Like the nickel plate, the zinc active anode is preferably (though not limited to) flexible, non-self-supporting and capable of being spirally wound or otherwise made to accept a desired configuration and to allow pressure stacking with relation to the rest of the cell contents as confined within the finished cell. The zinc electrode is not limited to, but preferably is composed of a thin sheet or grid substrate pasted, sintered, impregnated or otherwise securedly made active with a uniform bonded layer or covering of a zinc-active material.

The substrate typically may be a sheet or flat-grid structure such as woven wire screen, perforated sheet metal, et cetera, or expanded mesh (of iron, steel or other conductive metal) which is preferred because it is inexpensive and has desired characteristics. The substrate should provide a long-lasting base onto which the zinc-active material remains firmly in electrical contact, electrochemically active and reversible throughout the life of the battery.

Pasting is a preferred method of applying active zinc to the substrate. Conventional processes and paste mixtures are within the scope of the present invention. A preferred paste formulation consists of preferably from about 25 to about 99 and more preferably from about 35 to about 85 weight percent of relatively pure zinc powder and about 15 weight percent or less of mercuric oxide (or a functionally similar compound) mixed within a suitable binder, such as an aqueous solution of sodium carboxy methylcellulose. Zinc oxide may also be incorporated, preferably in amounts from about 10 to about 60 weight percent of the formulation. Enough binder should be employed to blend the components into a smooth paste.

Once the paste has been applied to the substrate such as by molding the paste on the substrate, and allowed to dry, it is important that the surface of the plate be relatively smooth so that a substantially invariant interface with adjacent separator is attained. It is often desirable to pressure mold the zinc active material to the substrate followed by a polishing step to achieve necessary smoothness. However, the degree of smoothness required of the plate will generally depend inversely on the ability of the separator material to deform, bend and otherwise intimately follow the contour of the surface of the electrode plate. Substantial absence of occluded voids along the interface prevents dendritic growth and greatly prolongs cell life. It is important that the entire surface of the plate remains active and localized excesses of current density are avoided to prevent abnormal emergence of zinc dendritic growth.

It is desirable to use an excess of reducible zinc-active material, e.g., ZnO, with respect to the amount of oxidizable cathode material present to minimize hydrogen evolution from the zinc plate and possible cell rupture during charge and overcharge. If this precaution is not heeded, or if for some other reason, excess gas pressure builds, an auxiliary electrode may be employed for degasification.

3. Separator

A separator is interposed between the opposite polarity electrode plates, for the purpose of preventing metallic conduction therebetween. At the same time, the separator material is composed of one or more layers which retain electrolyte and permit electrochemical conduction of ions between the plates. The separator portion immediately adjacent the zinc plate highly absorbs and retains the alkaline electrolyte in a bibulous, sponge-like manner. Another important feature of this separator layer is that when wetted and placed in intimate pressure contact relation with the zinc plate, the interface thus formed substantially lacks occluded voids, i.e., the separator layer closely follows the contour of the zinc electrode. It is critically required that the negative zinc plate be substantially homogeneously wetted with electrolyte for minimization or even substantial elimination of dendritic growth.

Another critical requirement of that portion of separator immediately adjacent the zinc electrode is that it be substantially uniform in porosity and permeability to electrolyte along the separator/zinc electrode interface. We have found that this requirement also extends to any surface taken substantially parallel to the interface in the body of the separator layer itself. This feature has been found to be essential in maintaining the aforementioned homogeneity of wetness criteria. According to this invention, this separator layer has permeability to air preferably in the range of about 0.1 to about 100, more preferably from about 0.5 to about 50 and most preferably from about 2.0 to about 10 cubic feet per minute per square foot of separator per one-half inch water pressure differential. Absorbency of this separator to alkaline electrolyte (35 weight percent KOH) is preferably in the range from about 0.55 to about 0.95, and more preferably from about 0.7 to about 0.9 grams of electrolyte per cubic cm. of separator and included electrolyte. Particularly preferred materials meeting the above criteria include cellulosic materials, particularly cotton cellulosic materials and most preferably fine grade filter papers, i.e., filter papers which resist attack by alkaline electrolyte and are resistant to oxidation. The degree of polymerization of cellulosic materials is defined as the number of anhydroglucose units per molecule. As differentiated from most conventional separators for alkaline cells, the preferred separators of the present invention are composed of fibers having a degree of polymerization preferably of at least about 3,500 and more preferably at least about 7,500. Non-cellulosic materials such as microporous rubbers or plastics, e.g., microporous neoprene, microporous polyvinyl chloride and microporous polyethylene may be utilized, though less preferred than filter papers.

Normal cellophane lacks mechanical strength and fails to properly conform to the contour of the zinc plate, i.e., voids often occur at the interface. Conventional, non-woven porous fabric separators, e.g., Pellon (a registered trademark of the Pellon Corporation) while a very good separator for the uses which it was designed (as in nickel-cadmium cells), is inoperative for purposes of the present invention and has created a stumbling block to prior art investigators in the nickel-zinc art. It lacks uniformity, is overly porous, and readily allows and promotes growth of zinc dendrites through the porous interstices. Under microscopic power of 100X, Pellon is seen to be a matrix of overlapping and intertwining fibers with definite channels permeating the matrix. The presence of significant channels or other occluded voids permits electrolyte to collect by capillary action and has been found to be detrimental in allowing dendrites to grow readily therethrough. In contrast, separators of the present invention appear cloudy and opaque even though some fiber structure can be see, and no channels are apparent.

A semi-permeable membrane such as regenerated cellulose (cellophane) may be utilized next to the above defined uniform separator layer material to further attenuate dendritic growth, and to prevent metallic conduction between the positive and negative plates, although not required.

Other layers of materials or coatings of suitable materials, known to those skilled in the art may be employed and are within the scope of this invention.

4. Electrolyte

Alkaline electrolyte is preferably employed. The electrolyte preferably provides a source of hydroxyl ions which enter into the electrochemical reactions at the plates. While the discharge reactions which take place at the nickel cathode (as an example) and zinc anode are believed to be as follows, the reactions are still not completely understood and the invention should not be so limited:

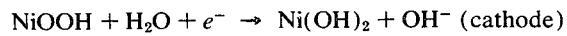
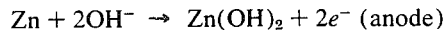

The charge reactions are the reverse of these discharge reactions. Preferred electrolytes include alkaline earth metal hydroxides such as calcium hydroxide and strontium hydroxide and alkali metal hydroxides, exemplified by sodium hydroxide, potassium hydroxide, lithium hydroxide, rubidium hydroxide and cesium hydroxide. Mixtures of the preceding may be utilized. Most preferred because of economics and dissociation characteristics is potassium hydroxide, preferably from about 20 to about 45 weight percent solution, although somewhat lesser or greater concentrations may be employed. Compatible, non-reaction-interfering additives may be utilized, including but not limited to corrosion inhibitors and solubility controlling agents such as potassium carbonate (See U.S. Pat. No. 3,485,673 to Jost) et cetera.

Only enough electrolyte should be present to wet the cell and support electrolyte conduction so that substantially no free electrolyte is present in the cell. A damp condition is preferred, although somewhat more or less wetting is operative. This starved electrolyte condition not only greatly reduces zinc dendritic growth, but also eases $O_2$ recombination with the zinc plate, thus preventing gas build-up.

5. Assembling the Cell

The cell assembly and configuration for the spirally wound embodiment will be more completely understood by referring to the accompanying drawings, where like numerals in the various figures denote like parts.

Referring to the figures, the inner cell components comprised of positive electrode 4, negative electrode 2 and separator 6 saturated to dampness with 35% KOH are constrained within cylindrical cell casing 8 having a top 10. The negative zinc electrode 2 is prepared by coating a long strip of expanded steel with a paste mixture of about 65 weight percent zinc powder, about 30 weight percent zinc oxide, and about 5 weight percent mercuric oxide made pliant with a sufficient amount of aqueous solution of methyl cellulose. The electrode strip is planished. The positive nickel electrode is made by impregnating a sintered nickel plaque with nickel active material, the substrate mesh 14 being somewhat more porous and less dense than the steel mesh 16 employed for the anode. The separator 6 consists of multiple layers of bibulous and membranous material(s). A layer of high quality filter paper of relatively uniform porosity and having a permeability to air of 7.0 cubic feet per minute per square foot of separator per one-half inch water pressure differential is adjacent the zinc electrode. The filter paper's retention of electrolyte is about 0.8 grams of electrolyte per combined cubic cm. of separator and electrolyte.

Figure 2:
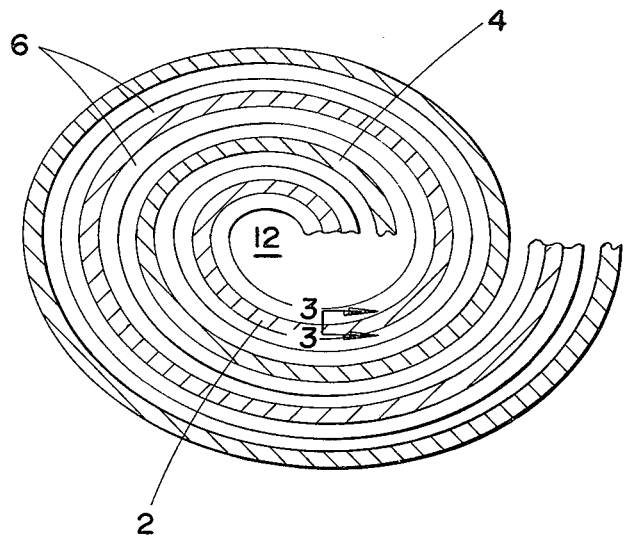
FIG. 2 shows an expanded diagrammatic view along Section 2—2 horizontally cutting the cell of FIG. 1.

The separator strip 6, zinc electrode strip 2 and nickel strip 4 are machine spirally wound under a pressure of about 300 pounds to give a tightly wound concentric configuration. FIG. 2 is a cutoff diagrammatic view of a partial section taken along Section 2—2 of FIG. 1. The cylindrical axial void 12 represents the space occupied by the mandrel on which the stacked cell contents are wound. In general, the stacking pressure is firm, sufficient to minimize the occurrence of voids. The stack pressure will depend on the cell configuration and the specific materials employed. Preferably at least about 100 p.s.i. and more preferably from about 250 to about 1,000 p.s.i. are employed. We have found that this minimum stack pressure of about 100 p.s.i. is highly beneficial in reducing dendritic growth, apparently because firm stack pressure reduces greatly the presence of pockets and voids within the separator and along the zinc plate/separator interface, and permits the use of less electrolyte.

The spirally wound package of FIG. 2 is tightly constrained to prevent unwinding or slippage, and is then inserted into the steel container can 8. The can is preferably electrically insulated with a plastic coating, polytetrafluoroethylene or other insulating material though not so limited. Alternatively, the entire can 8 may be made of a suitable insulating material. Metal conductive tabs (not shown) respectively extend from the anode to the steel can 8 and from the cathode to the underside of top 10, where the top and can are separated by some suitable insulator material such as rubber or plastic. Thirty-five percent KOH is added until the cell stack is very slightly damp, making sure that no free electrolyte is present. The top is secured to the can by crimping its edges over the mouth of the can or by other means. A cap 11 on the top 10 preferably contains a suitable safety valve for discharge of excessive gas pressure which can build up in the cell under adverse conditions, such as excessively high charge rate, though such a build up is rare and hermetically sealed cells may in some instances be useable, though not preferred for safety reasons. Paths for oxygen transfer and recombination are provided by space 22 at the bottom of the cell, a like space near the top of the cell (not shown) and the cylindrical axial void 12. These paths allow gas recombination and prevent rupture of the cell. The void space 22 is further beneficial in preventing a localized build up of electrolyte and formation of zincate pools.

Figure 3:
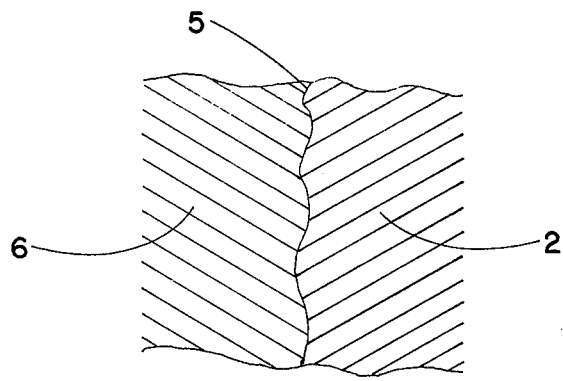
FIG. 3 is an expanded view detailing the interface between zinc plate 2 and separator 6, taken along Section 3—3 of FIG. 2.

In FIG. 3, which shows a partial sectional view taken along Section 3—3 of FIG. 2, the interface 5 formed by separator 6 and zinc plate 2 is shown in a blown-up, detailed view (approximately 100 times). The separator intimately follows the contour edge of the zinc plate, and substantially no occluded voids or pockets are present. Under the same microscopic power, Pellon is seen to leave noticeable pockets, voids and channels extending radially from the separator/electrode interface.

6. Examples

While the following working examples illustrate certain preferred aspects of the invention, the invention is not thereby limited to these illustrations.

EXAMPLE I

The accompanying Table I compares performances of a standard nickel-cadmium cell (Cell B) and a typical prior art nickel-zinc cell (Cell C) with a nickel-zinc cell of the present invention (Cell A). The most important advantages of Cell A over Cell B are its increased nominal cell voltage (25%), higher energy density, and greatly reduced cost. Cell B does have the advantage of longer cycle life, but for nearly every purpose to which these cells are put, the cycle life of Cell A is more than adequate to meet the use. However, there are a number of applications in which at least a cycle life of 150 or 200 cycles is required, and Cell C is deficient in this aspect while Cell A meets the requirement. Cell A has the further significant advantage over Cell C in being able to maintain any desired attitude during discharge (or charge). Cell C, on the other hand, is not permanently sealed and, thus, requires maintenance, in some cases upright positioning during use, et cetera.

TABLE I

| Typical Cell Values | Cell A[1] | Cell B[2] | Cell C[3] |
| --- | --- | --- | --- |
| Nominal Cell Voltage | 1.6 | 1.2 | 1.6 |
| Ampere-Hours per Cubic Inch | 1.2 | 1.2 | 0.72 |
| Watt-Hour per Pound | 18.7 | 14.4 | 16.4 |
| Watt-Hour per Cubic Inch | 1.9 | 1.4 | 1.16 |
| Average Cycle Life | 300 | 500+ | 112 |
| Permanently Sealed | Yes | Yes | No |

[1] Nickel-zinc cell of the present invention.
[2] Typical conventional nickel-cadmium cell.
[3] Typical average prior art nickel-zinc cell as disclosed in "Nickel-Zinc Cells," 21st Annual Power Sources Conference, Pages 70–79.

7. Modification of the Invention

It should be understood that the invention is capable of a variety of modifications and variations which will be made apparent to those skilled in the art by a reading of the specification and which are to be included within the spirit of the claims appended hereto. One such modification includes the variety of geometric cell configuration which can be used, e.g., vertically stacked parallel plates, the horizontally stacked "button" cell, and a spirally wound rectangular cell.

What is claimed is:

1. A high energy density alkaline, normally sealed rechargeable cell comprising:
   a. at least one electropositive electrode comprising nickel compound as active material;
   b. at least one electronegative active zinc-containing electrode disposed in spaced adjacent relationship to and in electrochemical communication with said positive electrode(s);
      at least said electronegative electrode consists essentially of its active material pasted on collector grid substrate(s) of compatible conducting material to form pasted rigid or non-rigid electrode plate(s), said electronegative electrode made smooth by pressure molding the paste to the supporting grid substrate;
   c. an electrolyte-absorbing and retaining separator disposed between and in intimate contact with said opposite polarity electrodes, where that portion of the separator immediately adjacent the zinc-containing electrode is a material of substantially uniform microporosity and permeability within the entirety of any surface taken substantially parallel to the interface formed by the separator and zinc-containing electrode;
      said zinc-containing electrode being substantially homogeneously wetted along its interface which is substantially free of occluded voids;
   d. electrolyte absorbed and retained by said separator material to the extent that substantially no free electrolyte is present between the electrodes, but in extent sufficient to provide the homogeneous wetting of the negative electrode and sufficient to promote electrochemical conduction between the electrodes;
   e. container encapsulating and constraining said electrodes and separator material and electrolyte under firm stacking pressure to form a self-supporting integral cell; and f. means for withdrawing current from electrodes of opposite polarity within the cell.

2. A high energy density alkaline, normally sealed rechargeable cell comprising:
- a. at least one electropositive electrode plate;
- b. at least one electronegative active zinc-containing electrode plate disposed in spaced adjacent relationship to and in electrochemical communication with said positive electrode(s) plate;
- c. an electrolyte-absorbing and retaining separator disposed between and in intimate contact with said opposite polarity electrodes, where that portion of the separator immediately adjacent the zinc-containing electrode is a material of substantially uniform microporosity and permeability within the entirety of any surface taken substantially parallel to the interface formed by the separator and zinc-containing electrode;
  said zinc-containing electrode being substantially homogeneously wetted along its interface which is substantially free of occluded voids;
- d. electrolyte absorbed and retained by said separator material to the extent that substantially no free electrolyte is present between the electrodes, but in extent sufficient to provide the homogeneous wetting of the negative electrode plate and sufficient to promote electrochemical conduction between the electrodes;
- e. container encapsulating and constraining said electrodes and separator material and electrolyte under firm stacking stacking pressure to form a self-supporting integral cell;
  a space being provided between a portion of the cell container and electrode plates to allow gas communication and recombination between the electrode plates;
- f. means for withdrawing current from electrodes of opposite polarity within the cell.

* * * * *